US006922676B2

(12) United States Patent
Alnwick

(10) Patent No.: US 6,922,676 B2
(45) Date of Patent: Jul. 26, 2005

(54) METHOD AND SYSTEM FOR ORDERING ITEMS OVER THE INTERNET

(76) Inventor: Jeffrey Alnwick, 386 Oakwood Rd., Huntington Station, NY (US) 11746

( * ) Notice: Subject to any disclaimer, the term of this patent is extended or adjusted under 35 U.S.C. 154(b) by 149 days.

(21) Appl. No.: 09/732,738

(22) Filed: Dec. 11, 2000

(65) Prior Publication Data

US 2002/0007318 A1 Jan. 17, 2002

Related U.S. Application Data

(63) Continuation-in-part of application No. 09/616,531, filed on Jul. 14, 2000.
(60) Provisional application No. 60/173,823, filed on Dec. 30, 1999.

(51) Int. Cl.[7] .............................................. G06F 17/60
(52) U.S. Cl. ............................. 705/28; 705/26; 705/27; 705/22; 705/29
(58) Field of Search .............................. 705/26–29, 10, 705/14, 22, 16–17, 20; G06F 17/60

(56) References Cited

U.S. PATENT DOCUMENTS

| | | |
|---|---|---|
| 4,992,940 A | 2/1991 | Dworkin |
| 5,940,807 A | 8/1999 | Purcell |
| 6,009,413 A | 12/1999 | Webber et al. |
| 6,014,644 A | 1/2000 | Erickson |
| 6,023,683 A | 2/2000 | Johnson et al. |
| 6,055,516 A | 4/2000 | Johnson et al. |
| 6,081,789 A | 6/2000 | Purcell |

(Continued)

Primary Examiner—Cuong Nguyen
(74) Attorney, Agent, or Firm—Bernard Malina; Malina & Associates, PC

(57) ABSTRACT

A system and method of ordering components over the Internet. A website owner would provide websites for one or more wholesalers including a home page for each of the wholesalers on the Internet as well as various cascading website pages. A customer would be able to determine whether a particular component was in stock utilizing the webpage of a particular dealer and would have the ability to order that component from that wholesaler. The customer can request a blind shipment which conceals the fact that the product came from the wholesaler's inventory and not the customer's inventory. Additionally, one or more graphical representations would be provided illustrating the customer's participation in a bonus discount program. More specifically, a bar graph would be used to show the user's participation. When an order is in place, the height of the bar graph would increase until it reaches a particular target value. An exchange platform can be provided allowing a number of customers to retrieve the inventories of a number of sellers. The customer could search the inventories of the sellers and would be able to contact the sellers directly to place an order to utilize the exchange platform to place the order.

7 Claims, 11 Drawing Sheets

U.S. PATENT DOCUMENTS

| | | | |
|---|---|---|---|
| 6,169,979 B1 * | 1/2001 | Johnson | 705/412 |
| 6,477,503 B1 * | 11/2002 | Mankes | 705/5 |
| 6,577,602 B1 * | 6/2003 | Beck et al. | 370/241.1 |
| 6,601,036 B1 * | 7/2003 | Walker et al. | 705/10 |
| 6,673,314 B1 * | 1/2004 | Burbank et al. | 422/44 |
| 6,708,879 B2 * | 3/2004 | Hunt | 235/385 |
| 2001/0051905 A1 * | 12/2001 | Lucas | 705/29 |
| 2002/0038267 A1 * | 3/2002 | Can et al. | 705/28 |
| 2002/0049549 A1 * | 4/2002 | Rogers et al. | 702/50 |
| 2003/0034390 A1 * | 2/2003 | Linton et al. | 235/382 |
| 2003/0097304 A1 * | 5/2003 | Hunt | 705/22 |
| 2003/0101454 A1 * | 5/2003 | Ozer et al. | 725/42 |
| 2003/0105000 A1 * | 6/2003 | Pero et al. | 514/12 |
| 2003/0110171 A1 * | 6/2003 | Ozer et al. | 707/10 |
| 2003/0126072 A1 * | 7/2003 | Brock | 705/38 |
| 2003/0135431 A1 * | 7/2003 | Schwartz et al. | 705/28 |
| 2003/0158795 A1 * | 8/2003 | Markham et al. | 705/28 |
| 2003/0204451 A1 * | 10/2003 | Chu et al. | 705/28 |
| 2003/0212614 A1 * | 11/2003 | Chu et al. | 705/28 |
| 2004/0002901 A1 * | 1/2004 | Baker et al. | 705/26 |
| 2004/0008123 A1 * | 1/2004 | Carrender et al. | 340/825.49 |
| 2004/0034581 A1 * | 2/2004 | Hill et al. | 705/28 |
| 2004/0068455 A1 * | 4/2004 | Jacobus et al. | 705/36 |
| 2004/0178264 A1 * | 9/2004 | Linton et al. | 235/385 |
| 2004/0204063 A1 * | 10/2004 | Van Erlach | 455/556.1 |
| 2004/0243470 A1 * | 12/2004 | Ozer et al. | 705/14 |
| 2004/0267714 A1 * | 12/2004 | Frid et al. | 707/3 |
| 2005/0021403 A1 * | 1/2005 | Ozer et al. | 705/14 |
| 2005/0027622 A1 * | 2/2005 | Walker et al. | 705/28 |

* cited by examiner

METHOD AND SYSTEM FOR ORDERING ITEMS OVER THE INTERNET

RELATED APPLICATIONS

This application is a continuation-in-part of application Ser. No. 09/616,531, filed Jul. 14, 2000, which claims priority of Provisional Application No. 60/173,823, filed Dec. 30, 1999.

BACKGROUND OF THE INVENTION

1. Field of the Invention

The present invention concerns a system for allowing customers to search an inventory of items such as parts, quickly obtain a price quote, receive bonus points towards a discount, and instantly order the required part on a real time basis.

2. Related Art

Business-to-business commerce has been revolutionized in the last few years. Computerization and Internet communication have substantially altered the landscape for doing business. The use of personal computers, both in the home, as well as in the business place, and the recent pervasive nature of the Internet, has allowed individuals and companies to order different products without requiring the individual or the company to physically travel to a place of business or telephoning a product provider or physically completing an order form.

A number of United States patents have recently issued directed to utilizing the Internet to order products. For example, U.S. Pat. No. 6,009,413, issued to Webber et al, describes a system for real-time shopping in which a network host maintains product/service information from a variety of merchants. The system would be able to take orders from the network host's customers and would then forward these orders to the respective merchants. However, the Webber et al patent does not describe a system in which real-time quotes could be provided.

U.S. Pat. No. 6,023,683, issued to Johnson et al, discusses an electronic sourcing system in which a computer would maintain a catalog database including product information. This particular system would check the availability of the items requested and would generate one or more purchase orders for the desired items from inventory locations stocking these items.

However, the Webber et al and Johnson et al patents are not directed to a situation in which a middle-man is endeavoring to obtain products from a wholesaler for a retailer client. More specifically, neither of these patents are directed to the area of supplying computer components from the wholesaler to a resaler. In this industry, a customer-user places an order with the wholesaler that sources a large inventory of often hard-to-find components. The customer must know quickly whether the wholesaler has the particular component in its inventory or can readily access the component. Additionally, the price for obtaining this item must be immediately producible. An order must then be capable of immediate placement. Of further importance is the ability of the wholesaler to blind-drop shipments. By this it is meant shipping the orders directly to the clients of the customer with the customer's name and return address on the package and not the address of the supplier or the original equipment manufacturer.

Provisions for incentives to the customers are necessary to attract business. Volume discounts are a well-known technique for accomplishing this end. Several recently issued United States patents are directed to systems which would attract customers. For example, U.S. Pat. Nos. 5,774,870 and 6,009,412, both issued to Storey, discuss a fully integrated on-line interactive frequency and award redemption program which would calculate award points based upon purchases a user made on-line. Additionally, U.S. Pat. No. 5,937,391, issued to Ikeda et al relates to a point-service system in an on-line shopping mall. Points are issued to a customer corresponding to a purchase amount. A point storage device stores the number of points accumulated by the customer. A points issue ratio and points redeeming ratio can be set for each business forming the on-line shopping mall.

However, none of these patents describe a system utilizing creative, visual incentives necessary to provide customers with bonuses that can promote sales.

Accordingly, it is an object of the present invention to provide a system for reselling computer parts which allows customers to almost instantaneously determine available inventory, correlate to a manufacturer part number, and rapidly place the order. Additionally, although the present invention describes a system for reselling computer parts, it is envisioned that this invention is not so limiting and could be utilized in various fields.

Another object of the present invention is to provide a system for the resale of computer components which operates through a website on the Internet.

Still another object of the present invention is to provide a system for the resale of computer components while advising customers of their earlier purchases, reporting on earned discount credits and rapidly displays the building of these credits. Yet another object of the present invention is to provide a system for resale of computer parts on a website of the Internet which displays a seller's membership in a certified organization to increase the customer's confidence in the quality of service.

A further object of the present invention is to provide an exchange platform allowing a number of vendor customers (sellers) to submit inventories for review by a number of exchange customers (buyers).

Still another object of the prsent invention is to provide a system allowing the exchange customers to order inventory through the exchange platform.

Another object of the present invention is to provide an exchange platform which would automatically poll the vendor customers to update the inventories of each of the vendor customers.

SUMMARY OF THE INVENTION

The deficiencies of the prior art, as well as the objects of the present invention, are addressed utilizing a method and system for the resale of computer components or other items which include the utilization of a home page on a website of the Internet operated by a component wholesaler. The specific website would be developed and operated by a website administrator. Information contained on the website would reassure customers of the wholesaler's quality of service by displaying on the website an internationally recognized certificate of quality, such as an ISO 9002 certification or A+certifications. The website would include a display window on the home page or a link page eventually allowing the customer to enter a request for a computer component. Although the present invention will be discussed with respect to the field of computer components, it is noted that the invention is not so limited and could be utilized for the purchase of any item utilizing the Internet.

Since in many instances it is to be envisioned that the purchaser of the computer component is a middle-man purchasing the component from a wholesaler to a buyer-client, the system according to the present invention would allow the utilization of a "blind shipment" allowing the wholesaler to ship the component to the middle-man's client wherein a packing slip would include the address of the middle-man and not the wholesaler.

A further aspect of the present invention is to utilize a system of processing requests generated by a particular customer through the home page on the website operated by a wholesaler of items such as components, as well as the databases included or associated therewith on a real time basis. This is quite important since the present invention envisions a system in which a multitude of customers are constantly accessing the website and the databases for the purpose of ordering the components. Since the databases represent a particular inventory of components, it is important if a customer orders a particular item, this item is guaranteed to be shipped to the customer. Therefore, once the order is placed, the inventory of that particular item is decreased by one so that the database reflects the current number of components included in the inventory. Once the inventory of the particular item is depleted, no additional customer can order that item.

An optional further aspect of the present invention is a bonus program built on a discount structure. A bar or other type of graph is diagramed on a linked page showing a total dollar target figure. Each of the dollar targets is tailored to a specific client or middle-man. Preferably, the bonus would be in the form of a bar graph. When orders are placed, the graph would increase in height toward the dollar target figure. Movement of the bar graph towards a monthly, or other time period goal, provides an incentive to order additional products. A customer such as a corporate purchasing agent will, through the bar graph, be encouraged to order additional products so as to "put him over the top" and achieve the financial incentive.

A second embodiment of the present invention describes an exchange platform wherein a number of exchange customers can review the inventories of a number of vendor customers. The exchange platform would allow the exchange customers to search as well as to order products from the vendor customers inventories. Based upon the type of inventories provided on the exchange platform, an exchange customer may contact the vendor customer directly, or an order might be placed through the exchange platform by the exchange customer to the vendor customer.

The second embodiment of the present invention would provide an exchange platform in which the inventories of the vendor customers are transmitted to the exchange platform in a batch file or automatically retrieved by the platform on a periodic basis by polling the vendor customer's server.

BRIEF DESCRIPTION OF THE DRAWINGS

These and other features and advantages of the present invention will become apparent in the following detailed description of the preferred embodiment of the invention as shown in the drawings wherein.

DETAILED DESCRIPTION OF THE INVENTION

A number of companies within the computer component resale industry have websites and, as a broker service, post on-line inventories of other companies who buy and sell products to each other. However, there is no ordering facility within these websites. Some components resalers have websites that consolidate the inventories of other companies and offer these inventories to subscribers. Orders from the subscribers are processed and re-forwarded to the appropriate inventory provider, less a service fee. Considerable improvements in these systems are necessary to achieve instant and quick service.

The present invention provides a system based on an electronic commerce website which is retail-oriented, rather than distribution-oriented. Various new and improved features are presented through this system.

Figure 1:
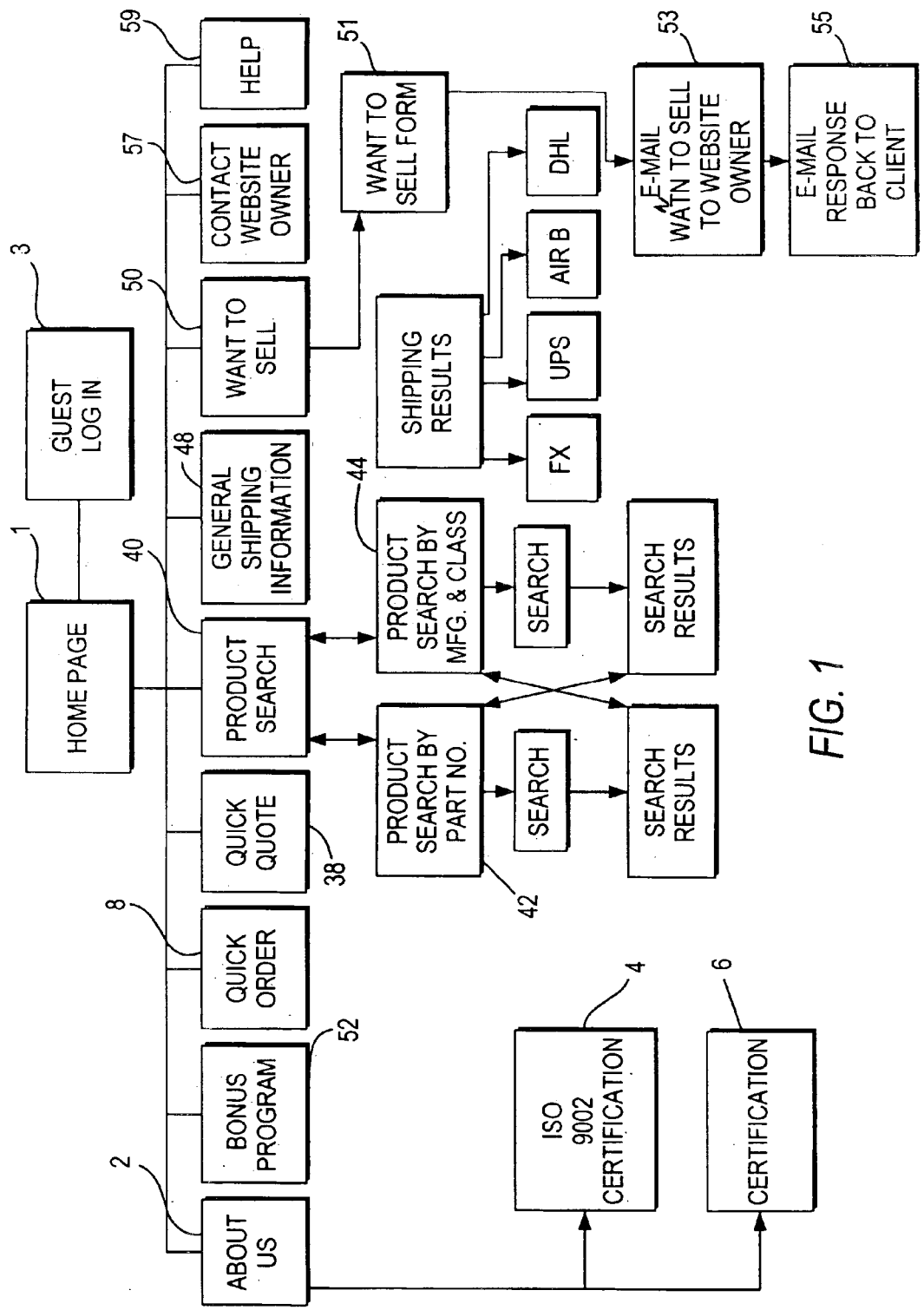
FIG. 1 is a schematic flow chart of the home page in a series of linked pages cascading therefrom in the first preferred embodiment of the invention.

FIG. 1 provides an overview of the website and linked pages. A customer ordinarily enters through a home page 1 by appropriately logging in. This provides a sharp and appealing website that downloads quickly. The site is directed towards purchasing agents ordering parts for next-day delivery. Questions can be rapidly answered, such as: Is the product in stock? What is the price? Can I get the component tomorrow? If the answer to these questions is in the affirmative, the purchasing agent would then purchase that particular component and would move on to the next purchase. In other words, these processes would move quickly.

Figure 2:
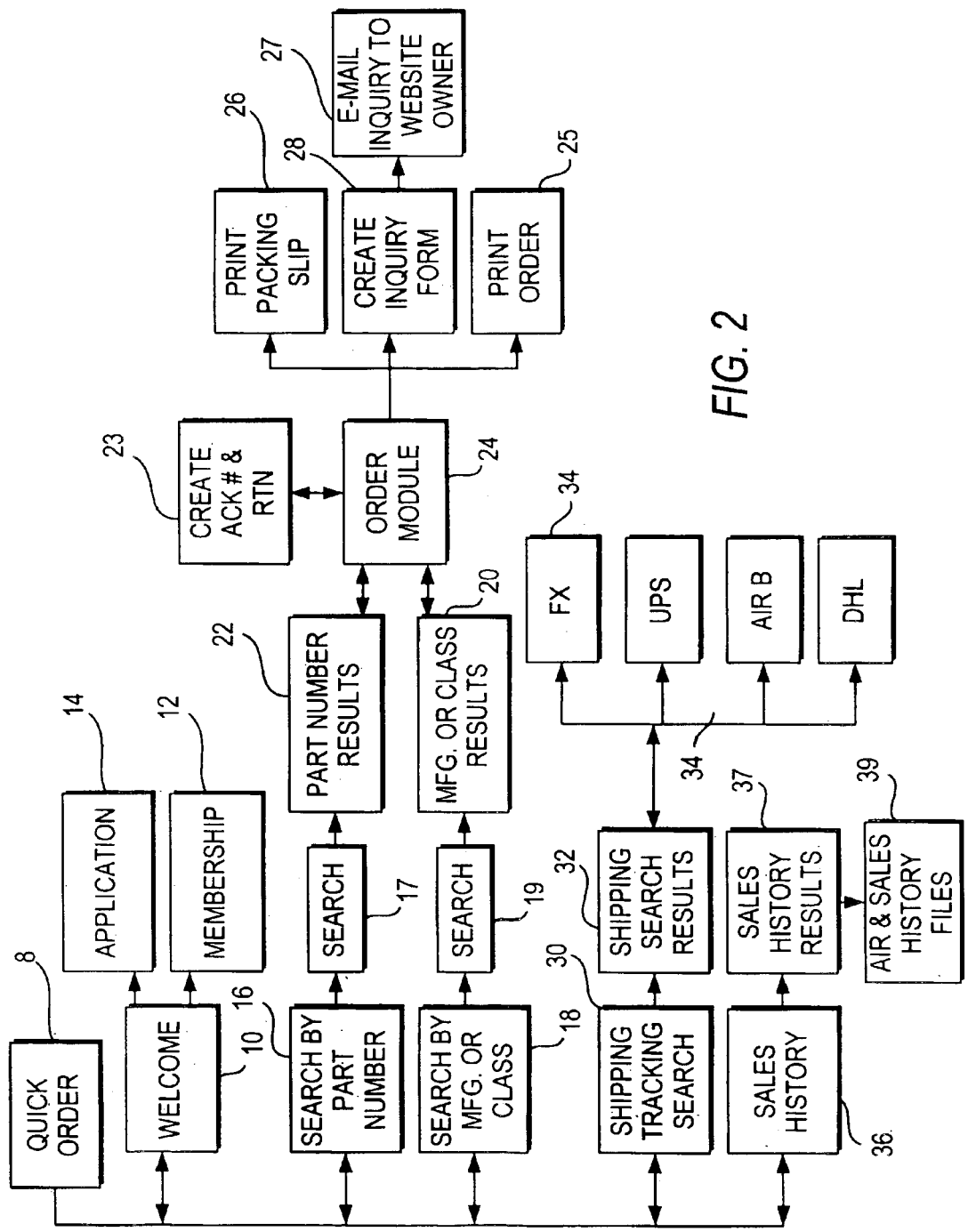
FIG. 2 is a schematic flow chart of a quick order system with cascading website pages in the first preferred embodiment of the invention.
Figure 3:
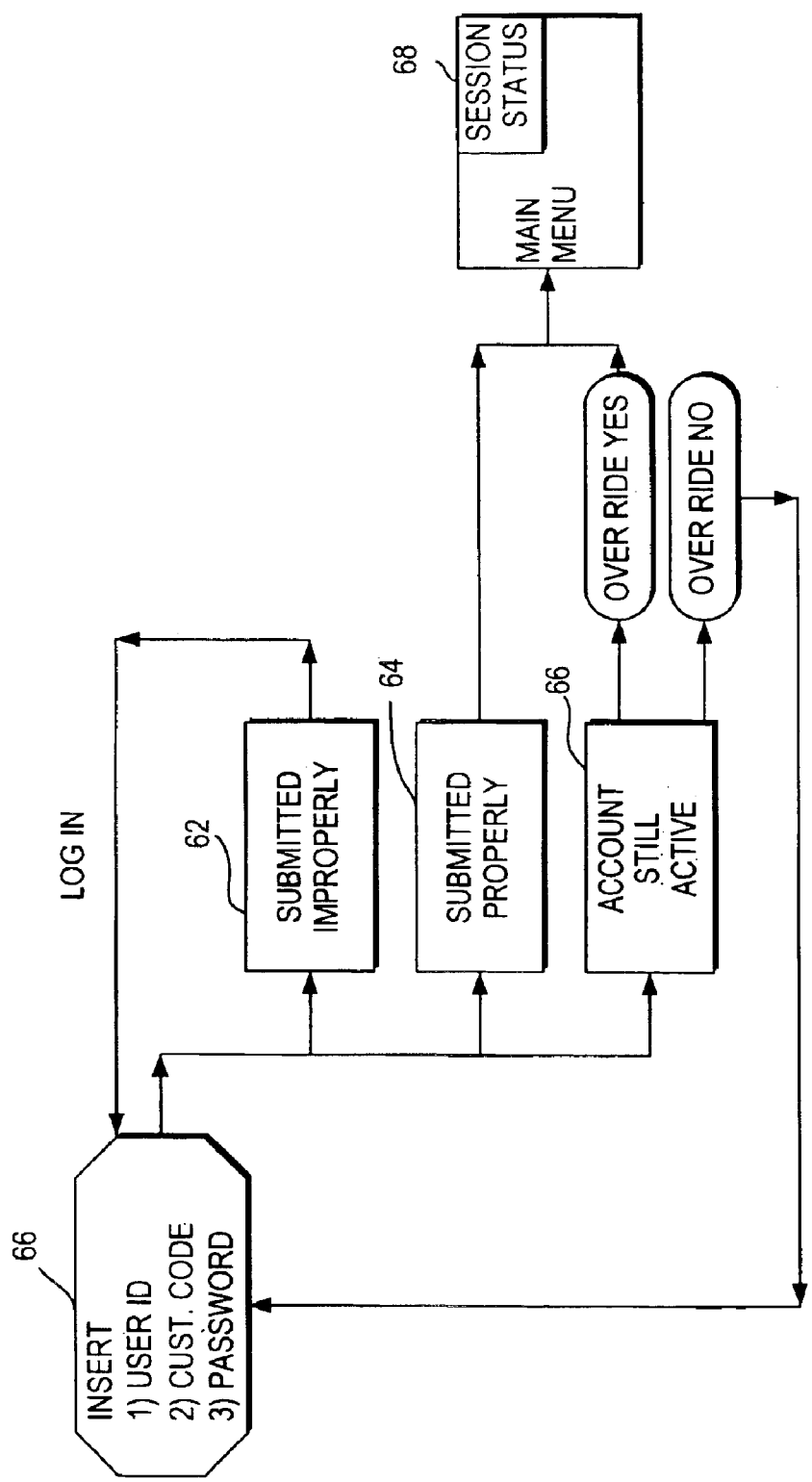
FIG. 3 is a schematic flow chart of the log-on procedures of the present invention in the first preferred embodiment thereof.

Upon logging in, if the purchaser has been a previous user of the system, the purchaser would insert his unique identification number, a customer number and a password page 60 of the log-in screen illustrated in FIG. 3. If this data has been entered and submitted properly, it would be accepted as validator and permit the customer to proceed at page 64 to the menus shown in FIGS. 1 and 2. If this data has been entered improperly or is invalid, as shown in step 62, the customer would be returned to the log-in screen. The system according to the present invention offers a unique and advantageous data retention feature. Since the Internet is subject to many outside irregularities over which it has no control, such as storms, ASP hardware failure, satellite transmission failure, workman cutting transmission cables, etc., the occurrence of any of these factors would terminate the connection between the customer and the website.

Generally, when this occurs, the customer, when subsequently logging in, must begin any inquiry or procedure anew. However, the system according to the present invention, would avoid time consuming delays in which the customer must begin his procedure inquiry at the starting point.

Upon re-entry into the present invention after an unscheduled exit or improperly logging off, the present invention will determine if the customer was in the middle of a procedure such as a search, a quote or an order. If this is the case, a message will be displayed asking the customer if they want to override an "account still active" message shown as reference numeral 66. Overriding this message by answer "yes" would bring the customer to the main menu shown in FIG. 1. This main menu will include a session status box shown as reference numeral 68.

If the customer has been in the middle of a search, quote or order (SQO) module, the session status box will indicate this fact, as well as a number of line items that were associated with the search, quote or order. The present invention will retain all line item information associated with the SQO and will display this information upon re-entry into the appropriate module. This feature offers the customer of the present invention time savings, as well as increased accuracy. The SQO module listed above will be described in more detail hereinbelow. The present invention has been designed to be either a closed or open system. In its use as a closed system, each customer must be pre-qualified, passing certain financial considerations to purchase a product through the website of the present invention. If this has occurred, the customer will be issued the required user identification and password data to enter the system. A guest module is offered when the present invention is used as a closed system. This guest module offers a potential customer exposure to many, but not to all of the features and capabilities that are offered to a qualified customer. The motivation of the guest module is to encourage the guest to provide financial data to become a customer. If the present invention is used as an open system, the guest module is not offered at all and intermediate purchasing capability and proper card authorization is enabled. Approved customers would have the capability to review the terms and conditions which apply to the use of the system.

When a guest logs in to a guest log-in screen 5, the guest is required to fill in all fields of a guest application screen. The guest may not proceed within the present invention until data in all of the fields has been entered. The guest will be returned to the guest application screen if all fields have not been inserted. The guest would then be provided with an opportunity to review the website's policy and terms and to which conditions the guests are subject. If data in all the fields has been completed and the application is submitted and processed properly, the present invention will display a guest's unique identification, password and customer code. Providing this data to the guest would allow the guest to visit various portions of the website such as the search module and an auction (will sell) module. The guest would also be giving the opportunity to enter messages and would, of course, be allowed to exit from the website. An expiration date may or may not be assigned to the guest's identification and password.

At the screen displaying the guest's identification and password, the guest is given the opportunity to review various policies and/or link to the websites of companies whose products are sold therein. This linking provides a guest with the opportunity to secure the proper item information to make a proper search within the website.

The guest application is e-mailed to the website's administrator immediately upon completion and is simultaneously added to a contact manager software program. This is an extremely useful capability since the guest information is automatically retrieved from the contact manager program when the guest becomes a customer by completing the appropriate applications.

The guest will then be forwarded to the main menu shown in FIG. 1 and be permitted restricted access within the system. However, although all of the modules will be shown to the guest in the main menu of FIG. 1, all these modules may not be accessed by the guest. If the guest accesses such a module, the features and capabilities of this module would be explained, but the guest would not be allowed access thereto.

Returning to FIG. 1, when a customer or guest logs in, a first link screen 2 would be displayed. This screen describes the wholesaler's company entitled "About Us". One of the main features of this screen is a link to the wholesaler's quality of certifications such as ISO 9002 and A+certifications. These certifications are found in links 4 and 6 and are industry accreditation establishing the company's professional responsibility and technical capability. These certifications are coveted recommendations that most competitors within the computer component industry do not have. Frequent use of the ISO 9002 logo is intended to be displayed throughout the site.

One important link provided in the menu shown in FIG. 1 is the quick order module 8 which integrates with an inventory database. Referring to FIG. 2, a flow chart for the screens emanating from the quick order module page 8 are illustrated. A subsequent link on the quick order screen is a welcome page 10. This page is for customers currently provided with quick order account codes. From this page, there are links to the benefits of joining described on a membership screen 12 and an application for membership on screen 14 for those interested in participating in the quick order program. A guest would not be allowed access to the quick order program unless an application is prepared and submitted to the website administrator. However, a guest can be provided with a test account code needed for limited access to the quick module. The test account code will perform all quick "functions" without actually issuing a sales order or reducing the inventory. Test use of this module will allow a guest to view all of the advantages of the quick order module and would allow this guest to be provided with a quick code access account which will be a time-dependent number issued by the website administrator.

The membership screen 12 will explain in detail, the benefits of membership. As part of the on-line service, premiere dealers will have access to their own website page. Through use of a personal, secure password, these dealers would be able to order directly from the company stock, check current spending levels and view updates on new products, availability and pricing. If there are special requests, these can be directed by e-mail to an account manager cutting down on phone and facsimile time. Other links directly accessible from the quick order page 8 would be that of a product search by part number (standard quick search) 16, as well as product search by manufacturer or class (advanced search) 18. Search screens 16 and 18 would be the first two of four search modules, along with two general searches initially accessible from the home page 1.

Since a majority of the customers would know the part number of interest, screen 16 will act as a default search module with the ability to search single or multiple line items from this screen. If an item is available and a customer wishes to purchase all or part of the available amount, the customer will place the desired amount in a column denoted "On Hand".

Customers who are not aware of the part number they need to purchase would be directed to the search by manufacturer and class advanced search screen 18. Links from screens 16 and 18 are then provided to the respective quick quote of manufacturing by class search and by part number search results shown as screens 20, 22. The search modules share with the quick order module 8, as well as a quick quote module 38, common structures and procedures. The shared structure is associated with the item search procedure. The SQO modules differ in the manner in which they deal with item search results. The SQO modules offer both the standard quick search, as well as an advanced search. The standard quick search is the default and basic item search when an item number is known. Item numbers are inserted into an item number search box, either individually, one at a time, or as a series of item numbers which can be cut and pasted from spread sheets or AOL Instant Messenger. There is no limit to the items that may be entered in either of these situations.

The SQO query results will display the item numbers found within the item number database whether they are available (on hand) or unavailable. Unavailable items may be back ordered in the order module. The website administrator assists the customer by detailing separately those items that were added to the SQO and those items that were not added to the SQO. The not added function will indicate that the not added item number was not found in the item database or was entered improperly.

The search by manufacturer or class module or advanced search 18 is used when an item number is partially known or not known at all. The advanced search module permits the customer to query an item:
  1. With a partial item number;
  2. By the manufacturer's assigned categories;
  3. By manufacturer;
  4. By any combination of items 1 to 3;
  5. By available or unavailable quantities of an item found within the item database; and
  6. By ten line items at a time (default setting) or up to 100 line items at a time.

A partial item query result will be displayed in alphabetical order, those item numbers most closely associated with the partial number. An item query item result by category and/or manufacturer will display all items found by this elected criteria in alphabetical order by item number, item description, availability and price. The customer may add any item found at the result screen 17, 19 by highlighting the item number.

Item number queries are normally limited to the manufacturer's item number. However, the present invention queries the item number database using substitute item numbers and customer assigned item numbers. A substitute item number is a substitute number authorized by the manufacturer of the item. If the originally selected item number is not available, the manufacturer's authorized item number will be displayed if it is available. A substitute number is displayed beneath the originally selected number on all documents generated by the website administrator, e-mails, quotes, target price requests, orders and invoices to provide a future reference.

Customer assigned item numbers are item numbers assigned by the customer to correspond to the manufacturer's item number. The customer assigned number is displayed beneath the manufacturer's item number on all documents generated by the website, e-mails, quotes, target price requests, orders and invoices to provide a future reference. Customer assigned numbers are introduced to the item number database by a spread sheet provided by the customer. There is no limit to the number of customer assigned numbers that may be used within the website. The customer may elect not to display the customer's assigned number by selecting the "Remove a Comment Field".

The item numbers offered to the customer may be:
  1. Offered from the general warehouse;
  2. Offered from a customer specific warehouse;
  3. Offered from a "virtual" warehouse;
  4. Limited to a maximum quantity availability;
  5. Subject to minimum pricing;
  6. Subject to discounting; or
  7. Not offered at all.

Although every item within an inventory database must be assigned to a specific warehouse, combining these specific warehouses into a general warehouse offers flexibility in determining which items would be offered and to whom. The vast majority of items are offered from the general warehouse to all customers.

Items found in a specific warehouse can be offered to a limited number of customers or to a single customer. A specific warehouse would be used if a product was owned by a specific customer, but physically housed and administrated by the website administrator for a fee or the items were consigned and are provided at no cost to a company for sale through the website administrator and are physically housed and administrated by the particular website. Segregating to a specific warehouse is required for reporting purposes. A virtual warehouse would be a product owned by a customer and physically housed in the customer's facility.

The number of items that may be offered through the website administrator may be limited to a maximum number. For example, there may be a 500 items on hand, but only 50 are displayed as available. The present invention would allow for the immediate change of a minimum price.

Discounting within the website administrator is determined for each customer in various manners. For example, all items offered can be subject to the same discount percentage. Alternatively, all items offered are subject to the same discount percentage if the customer has maintained a negotiated minimum sales volume over a negotiated period of time. If the minimum sales volume is not achieved, no discount percentage would be displayed. Finally, each item would have a discount price. Specific items may be withdrawn from the discount formula, although the balance of items that fall within the same categories or warehouse are subject to discount. This facility would be used if a specific item was on constraint and difficult to locate.

Although search query results are not archived within the website administrator as are quote query results, a customer may still want to print a search query result locally for their own record keeping requirements. The website administrator provides a "keep" capability that permits a line item to be deleted from the search query results page. Selecting this "keep" capability and updating of the query would delete the selected line item. This capability assures an accurate duplication if the results are printed. The customer may proceed directly from one of the search modules to the quote module. The customer may also proceed to the order module and convert the search to a quote and the customer may clear and delete the search results.

A quick quote order module screen 24 is linked to the result screens 20 and 22. The screen 24 includes fields for an account number, customer number, shipping destination, date, customer order number, person placing order, shipment method, shipper number, terms, warrantee periods, component numbers, description, cost, order confirmation number, tracking number and additional related items. Once an order is placed, an acknowledgment of the order is returned to the customer as shown by reference numeral 23. Optionally, a bonus program graphics can be attached to this screen 24. From this module, a customer should be able to print his order for his hard copy purposes, go to the packing slip module or go to an inquiry module.

As previously indicated, the order module shares with the search module and the quote module common structures and procedures. These common structures were previously described with respect to the search module. The order module can be accessed from the search module, the quote module, from a "history" module, which is part of the quote module or directly from the order module 24. The order module 24 should be accessed by the customer only when the customer is satisfied with the pricing offered in either the search or the quote modules since the order module 24 does not permit price negotiation. The time period that the customer has to complete an order could vary. The ability to set this time period permits the company to protect itself against a customer that wanted to tie-up the product while it shopped this product from another vendor. If the customer has a history as being a "shopper" going from company to company to obtain the best price, the time period for completing the sale could be less than the typical customer. If the customer exceeds the allotted time it has to complete an order, the order is cancelled and all items committed to the order are returned to the inventory.

The results of an order query are displayed differently than queries resulting from either the search module or the quote module. Item quantities are displayed under column headings, either available (A) or committed (C). The available quantity represents the total number of the line item immediately available from the company. The committed quantity represents the total number of items committed to the order. The website administrator operates in a real-time environment offering product availability that is current and accurate to the instant that the item quantity is displayed. Once an item is committed to an order, it is removed from the available inventory. A committed item can be removed from the order and placed back into inventory by clearing or cancelling the order. The default quantity committed to an order is one, but may be increased at any time during order creation. If the committed quantity is increased, it is necessary to "update" the order. If the customer is satisfied with the contents of his order, he will continue to either a back order screen or to a billing/shipping screen. The customer may order a quantity of an order greater than the available quantity creating a "back order" of the item. The back order screen will display all line items that have been back ordered along with the quantity of the line item that has been back ordered. The customer has an opportunity to review the company's back order terms at this screen. Any back order item will be designated as a back ordered item on all e-mails, orders and invoices.

A print order screen 25, a print packing slip screen 26, as well as an inquiry form screen 28 are the next links downstream. When a customer requests a "blind" shipment, this conceals the fact that the product has come from the website company's inventory. The vast majority of customers that ship "blind" fax the website company a packing slip to accompany the customer's order which must be sent for resale to a third party. The quick order customer will require a packing slip. This will save the customer time and eliminate the objection that an on-line ordering system can not handle packing slips. The packing slip page 26 is linked downstream for electronically printing the packing slip. At this point, the customer's orders are printed as shown by the screen 25.

An order processed through the website administrator is not limited to shipment to a single location as is the circumstance in many Internet ordering systems. The customer has the option to ship its order to hundreds of addresses which are stored and maintained within the website. This website maintains blind shipment addresses (BSA), as well as alternate addresses (AA). With respect to the BSA, the customer orders the particular component through the website for direct shipment to their client. Since the customer does not want his client to be aware that the product the client order was not shipped from the customer's inventory, the product will be shipped directly from the company's inventory to the client's BSA without reference to the fact that the product did not originate from the customer's inventory. The use of a BSA turns on a flag that always prints a nondescript, generic packing slip to accompany the product sent to the customer's client. The automatic generation of the packing slip eliminates the necessity to have the customer fax a packing slip to the company, thereby saving time.

An AA is any address that does not require a packing slip to accompany the shipped product. The AA is normally a division or branch location of the customer. The customer can create their own individual BSA and AA to address files within the website. The customer, not the website company, has the responsibility to maintain the accuracy of this file. The customer's BSA and AA address file may be added to one address at a time as orders are created or loaded into the website from the customer's address file. The website administrator will assign the customer's address file to the proper location within the website using the customer's customer code to access and retrieve the required address.

The company has the ability to default either of the BSA or AA and the contents of this default will include address fields replaced by the contents of the BSA or AA. This would allow temporary editing, permitting the customer to provide special, but temporary shipping instructions such as receiving dock locations.

The customer may ship the BSA or AA file between one of two formats through use of a re-sort button. The re-sort button will format either an address file in alphanumerics or a customer code order. The customer selects the required address by highlighting the address or using the addresser's customer's code.

The selected BSA or AA may be edited or loaded into the ship to address fields. This edit is a permanent edit to the address file as opposed to a temporary edit that may be in the ship to address fields, such as a zip code change. The BSA or AA address required for the customer's order may not be new and not found in the address file and would have to be added to the appropriate file. When the customer is satisfied that the proper shipping address has been selected, the order would be printed.

Included in the print packing slip screen 26 would be the ability to add, edit or create a new address in either the BSA or AA file. Editing or adding information to either address file is identical to creating a new address with one exception. A new address requires a creation of the customer code, whereby the customer code of a BSA or AA already exists.

It is not uncommon for the customer's client to request that the product be shipped to the client's facility to be done using the client's shipper carrier number. Consequently, to provide a speedy, seamless order process, it is essential to maintain a carrier number database that is uniquely associated with the client. The client's carrier information normally remains consistent, but is subject to intermittent changes. The website administrator permits the customer to maintain and retrieve for a large number of ship to addresses for order processing purposes.

A quick order inquiry screen 28 will be available working in concert with the quick order part number search result screen 22 and the quick order manufacturing by class search results screen 20. In the results screens, certain items have been flagged for inquiry purposes. This is a self-explanatory form within screen 28 which would be filled in and completed automatically having captured data from the result screens 20 and 22, as well as the order module 24. This form will be e-mailed to a supplier of the website company for further processing with an original equipment manufacturer as illustrated by reference numeral 27.

A quick order tracking search screen 30 will be available as a further link. This screen will permit customers to inquire about the shipping status of an order. This screen may be accessed by either the home screen or from the main menu screen. If the tracking search is accessed from the home screen, the customer is required to insert his company's customer identification number. If the screen is accessed from the main menu screen, it is not required to enter the customer identification as it was required to enter this data for access to the main screen. The customer's purchase order causes the company to create an invoice. The invoice created by the wholesaler company contains all pertinent information contained on the purchase order and any newly created invoice information. The carrier tracking number used to ship the product associate with a particular purchase order/invoice is contained within the invoice body which is the most commonly retrieved data.

The customer must insert his company's purchase order number at the screen 18 to retrieve and display the requested purchase order/invoice. If the entire purchase order is not known, the customer may insert the first four digits of the purchase order number sequence followed by an asterisk and all purchase orders beginning with the inserted numbering sequence will be retrieved and displayed in chronological order.

If a single purchase order number results in the creation of several invoices, as often happens due to the back ordering of a product, all purchase orders/invoices associated with the purchase order number will be retrieved and displayed in chronological order.

The screen 30 provides URL links to the tracking websites of the manufacturers whose products are sold by the company. The customer may manually transpose, or cut and paste the carrier tracking number found on the purchase order/invoice into the carrier tracking text boxes that link to the carrier's website. The carrier will retrieve and display the shipping delivery status of the purchase order/invoice. If the purchase order number is inserted for a purchase order that has not been invoiced by the company, the present invention will display an "invoice not found" message.

A quick order on-line order/shipping information response form 32 will display information taken from an appropriate quick order or invoice as requested by the quick order tracking search page 30. A customer will be able to link into an appropriate shipper website 34 (such as Federal Express, UPS, DHL, or the like) to continue the search.

A quick order sales history 36 is a further downstream link. Customers will be able to secure month and year to date sales history by either invoice or item number as shown in a sales history screen 37 based upon information provided in the sales history files 39.

Returning to FIG. 1, a quick quote module screen 38 links directly to the home page 1. A customer will complete a form on this page requesting a computer component quotation. Automatically, this request will be electronically mailed to an original equipment manufacturer. A response will be returned to the on-site ordering system. Through this system of quotes, response time between a resale customer and an original equipment manufacturer via a broker company intermediate website can be sufficiently expedited.

As previously indicated, many structures of the search module and the order module are common to the quote module 38. However, the quick quote module 38 does have several unique characteristics. When the customers frequently request price and availability information for an item with full knowledge that this item might not be ordered until a future date if they order the item at all. The present invention has been designed to accumulate or archive a customer's quote for retrieval at a future date and hopefully convert this quote into an order. A customer may create a quote on one day and then retrieve this quote several days later and convert it to an order without reentering any data associated with the original quote. Upon completion of the quote, the unique quote number is assigned and stored with the customer's quote archive database for retrieval at a future date. The date and time the quote was created is also accompanied with the quote. A quote is either "active" or "expired" and is designated as such within the quote archival box. The company honors the item price of an active quote if this item is still available when the quote is retrieved and updated and converted into an order. The term that a quote may be "active" is determined on a customer-by-customer basis. An "active" quote would become expired if it is retrieved after this date. An expired quote, when retrieved, would display the current availability and pricing for items associated with the expired quote. However, the process on the quote will no longer be honored. The present invention automatically deletes any quote that has gone beyond a time period set by the company.

Quotes may be archived in a supervisor's quote archival database as well as the database of the customer that created the quote. It is possible to have authorization to create a quote, but not have authorization or create an order. In this circumstance, a supervisor would authorize the customer to convert the quote to an order. The available quantity displayed on the quote is in real-time and accurate to the second. However, during the time it takes to create the quote, the availability of a line item may be depleted by another customer who places an order for that item. To safeguard against creating a quote with an inaccurate item availability, the customer may update the quote instantaneously, thereby displaying the current availability. If the customer is satisfied with the item availability and prices associated with the quote, the quote may immediately be converted to an order by sending this quote to the order module 24. The quote may be viewed by the customer and printed locally.

A mirror image of the quote is e-mailed to the website administrator immediately after its creation. The e-mailed quote mirror image is immediately e-mailed back to an email address provided by the customer. One of the deficiencies of Internet transactions is a lack of assurance that a transaction has been accepted and processed. Immediately emailing a mirror image provides the customer assurance that the company has received the transaction. If an e-mail image is not received minutes after its creation by the customer, the customer should contact the company.

If the customer is not satisfied with the price or prices on the quote, a target price request may be created. This target price request (TPR) may be accessed from either the quote screen or from the quote history screen. The TPR screen displays the quote number, all line items associated with the quote, a new price column, as well as an additional comments text box. The customer would insert a target price in the new price column for each line that a price should be reviewed. The customer may insert a text message to accompany the TPR. A mirror image of the TPR is e-mailed to the website administrator immediately after its creation. This e-mailed TPR mirror image is then returned by e-mail to an address provided by the customer. The TPR activates an audible alarm at the company that remains audible until the website administrator retrieves the quote associated with the TPR. The website administrator reviews the quote associated with the TPR and inserts, if desired, a response price. Once the TPR has been reviewed and completed, the viewed quote is e-mailed back to the customer at which time the customer may select the reviewed quote at the quote history screen and convert the selected quote to an order if this price is acceptable to the customer.

Downstream from the home page 1 can be found the general product search page 40. Available on this page is information concerning the name of an original equipment manufacturing contact person, phone number of the contact as well as the date and item inquired about. Information on the original equipment manufacturer is refreshed daily from a list available to the website owner through subscription, but not generally open to the public. Further transmission of parts of the information is provided through this website. For instance, access is provided for customers on the website, but search results may be limited to quantity of components on hand without pricing. Access may also be granted only to those pre-qualified customers who want to shop for the best price and then order by phone. In this situation, the customer receives on hand pricing information while the website owner receives statistical information. Downstream links from the product search screen 40 may include a product search by part number screen 42 or a part search by manufacturer and class screen 44. These searches are the two additional types of searches alluded to when discussing the search by part number quick search screen 16 and the search by manufacturer or class advanced search screen 16 illustrated in FIG. 2.

A general order/shipping tracking system screen 48 may be a further link downstream from the home page 1. This webpage serves two functions. The first function allows the website owner to pass responsibility onto customers retracting their own orders. Secondly, this screen gives customers access to tracking any hour of the day, similar to the shipping tracking search 30 illustrated with respect to FIG. 2. Customer account codes (not limited to a quick order account code) would be sufficient to trigger the tracking process.

A "want to sell" or "auction" screen 50 can also be linked downstream from the home page 1. This screen is a derivative of the quick quote form. A customer will fill out this form shown at reference numeral 51 and electronically mail it to the website owner or administrator as shown by reference numeral 53. The website owner or administrator will then e-mail a response back to the client as shown by reference numeral 55. Items are retrieved from the company's item file and designated as an auction item with an asking price and an auction expiration date. An auction item remains displayed at the auction screen until the item's expiration date is reached, at which time it is removed from the auction screen. There are two ways to access the auction module. Firstly, the auction module may be accessed from the home screen or may be accessed from within the website administrator at the main menu screen. If the auction module is accessed from the home screen, the customer is required to insert his company's customer ID as identification. If the auction module is accessed from the main menu screen, it is not required to enter a customer ID as it was required to enter this data to access the main screen menu.

At the auction screen, the customer will insert the quantity and ask price for each auction that he wishes to bid. The present invention will allow the customer to e-mail this bid request to the website administrator and initiate an audible alarm that is turned off only when the bid has been reviewed. The website administrator will contact the bidder via e-mail or phone with the bid response at which time the customer can also respond.

A bonus program page 52 is linked directly to the home page 1. Participation in the bonus program can lower monthly components purchasing expense for a customer. As a participant in the bonus program, a monthly purchasing target is agreed. This target will be based upon a customer's sales history and forecast of his component requirements. As components are purchased through the bonus program, the website owner will track those purchases. If the monthly purchase target is maintained and achieved for a period of consecutive months, a customer can earn credit, based upon an agreed discount towards the next month's components purchase. For every month that the percent discount is achieved on a monthly purchase target, a customer will receive additional discounts against further component purchases.

Figure 4:
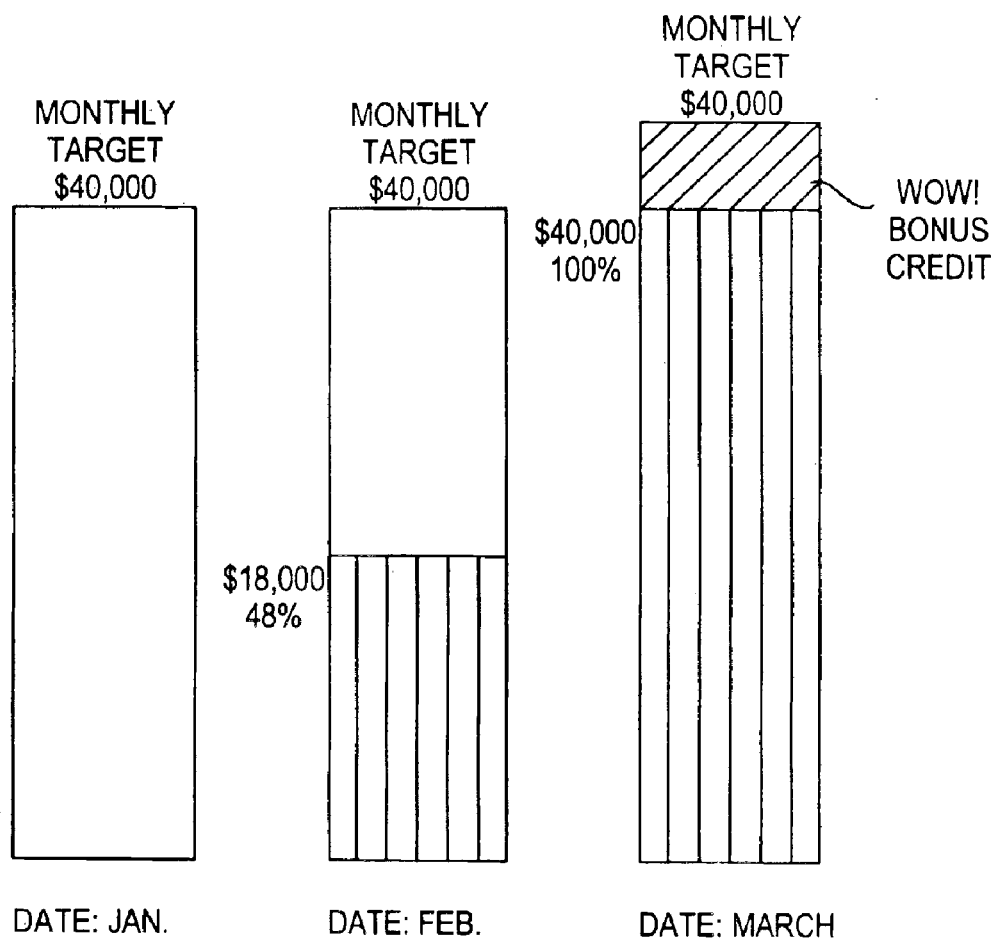
FIG. 4 is a series of bar graphs corresponding to a bonus discount program according to the present invention in the first prefereed embodiment thereof.

FIG. 4 illustrates one type of a visual incentive to a customer. A bar graph series is displayed on the bonus program page 52 or a link page. Each month or over a set of months, bars on the bar graph would increase in height relative to the amount of components purchased. When a bar reaches a threshold value, a bonus credit will be triggered.

The website administrator or owner can be directly contacted on the page at reference numeral 57 and can supply with customer with various information as well as assisting the customer using the system as shown by reference numeral 59.

Global Exchange Model

Figure 5:
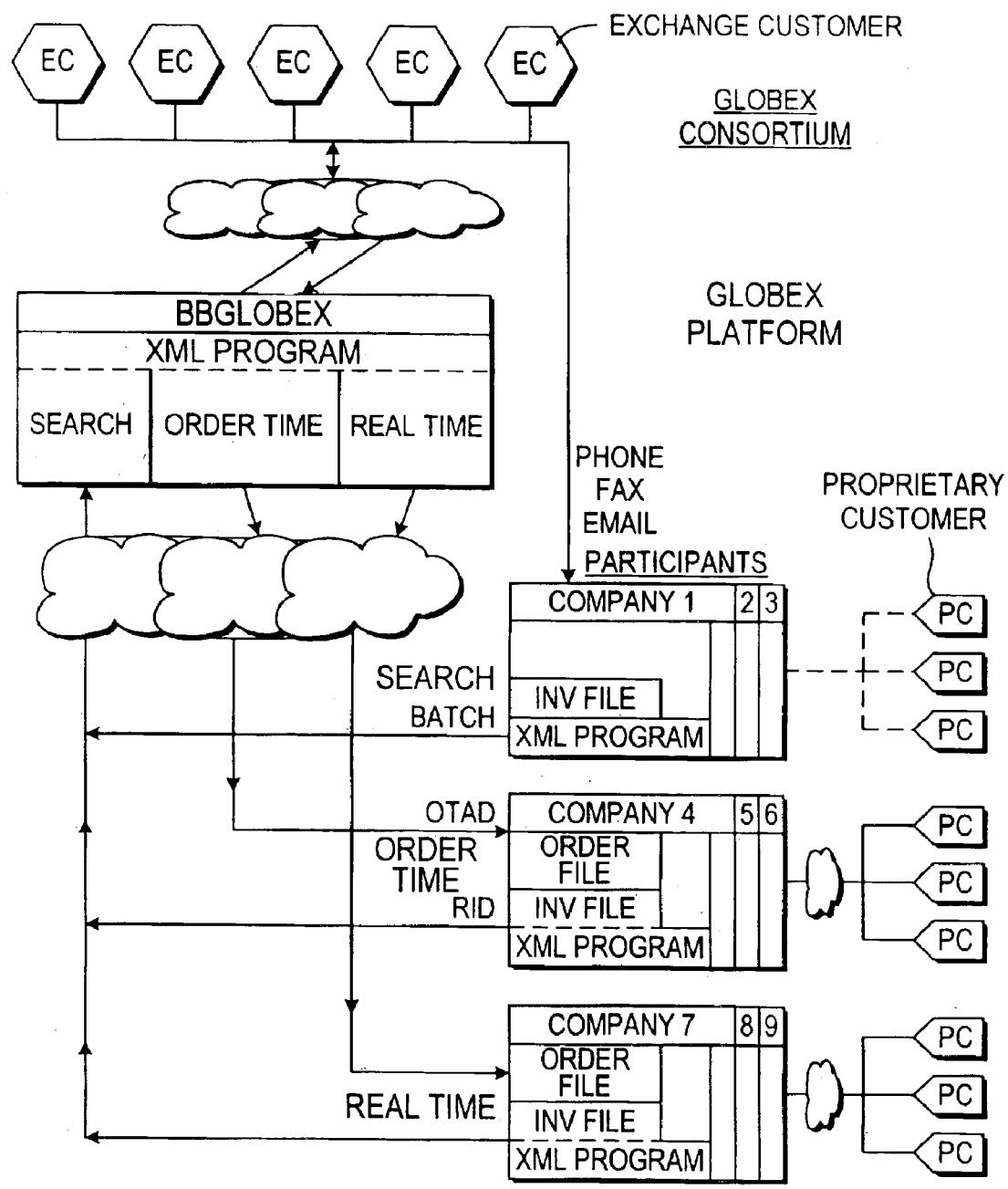
FIG. 5 is a schematic flow chart of the global exchange platform according to the present invention.
Figure 10:
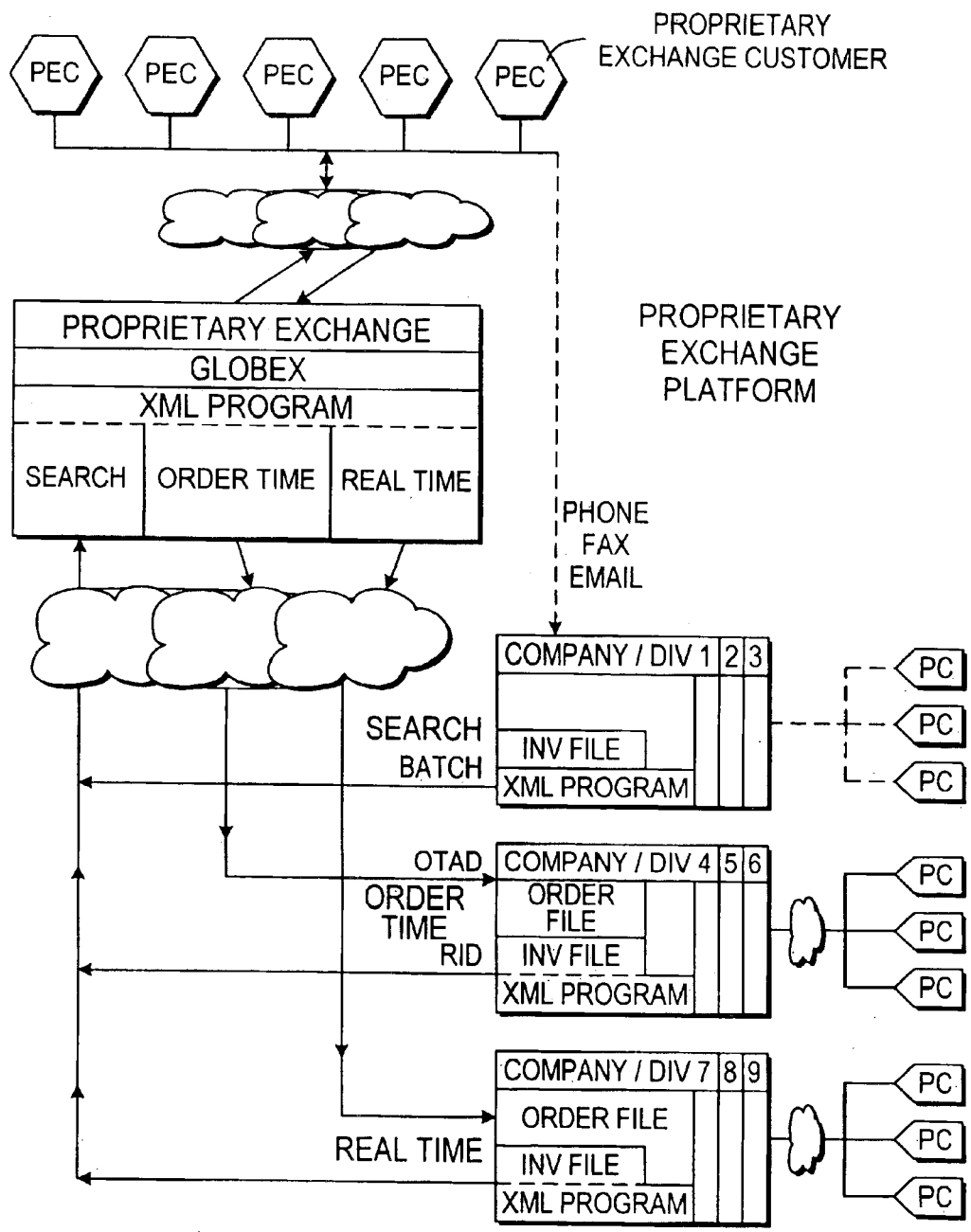
FIG. 10 is the schematic flow chart of the proprietary exchange system according to the present invention.

In a further embodiment of the principles of the present invention, the real time Internet ordering system (I.O.S.) set forth and described hereinabove may be embodied in an exchange platform which collects and organizes vendor customers inventories for presentation to its exchange customers (EC) as illustrated in FIG. 5 and proprietary exchange customers (PEC) as shown in FIG. 10. It is noted that PEC's and EC's are very similar for the purpose of this application. In operation, a vendor customer (VC) (seller) would forward inventory to the I.O.S. administrator for presentation and sale to the exchange customers. The VC's can be search time participants (STP), order time participants (OTP) or real time participants (RTP). An STP would normally forward a smaller inventory listing to the exchange platform and typically a smaller company with limited financial resources.

The STP would likely utilize a basic customer accounting platform (CAP) interfacing with the exchange platform through an extensible machine language program (XML) such as Linux, or, alternatively through a Middleware interface program. The inventory from an FTP may be forwarded as a batch file, which is received normally once or twice daily. Alternately, the VC's inventory may be automatically retrieved by a retrieval of inventory data program as hereinafter described or in real time. The retrieval of inventory data program (RID) automatically polls a server or a vendor customer (VC) or a proprietary customer (PC), retrieving additions and deletions that have occurred to the inventory files subsequent to the last polling. The PC is a customer which is proprietary with respect to a particular VC. However, the PC can also act as a PEC or an EC. This polling process is carried out periodically on a scheduled basis at intervals ranging from every hour to every five minutes. Since it ordinarily takes approximately five minutes to process an order under this system, inventories that are polled at five minute intervals may be deemed as being processed "Order Time." Generally the OTP or the RTP would employ the RID. The OTP would forward inventory to the exchange platform with the RID program. The OTP would receive target price requests (TPR), quotes and orders through an order time approval data program (OTAD). The purpose of the OTAD will be explained hereinbelow. Investing is swapped between the RTP's CAP and the exchange platform in a real time environment offering instant availability and immediate order processing.

The OTAD automatically notifies a VC/PC of an exchange customer's activity in its inventory. The OTAD holds ordered items against an order only. The VC/PC is notified of any TPR's, quotes, or access through the VC's/PVC's vendor view screen.

As shown in FIG. 5, each of the VC's can have one or more PC's associated therewith. Thus, PVC's may be shared with other exchange VC's. A PC can function as an inventory collection and ordering exchange for different divisions within a single VC.

I.O.S. Stand Alone Platform Application

Figure 6:
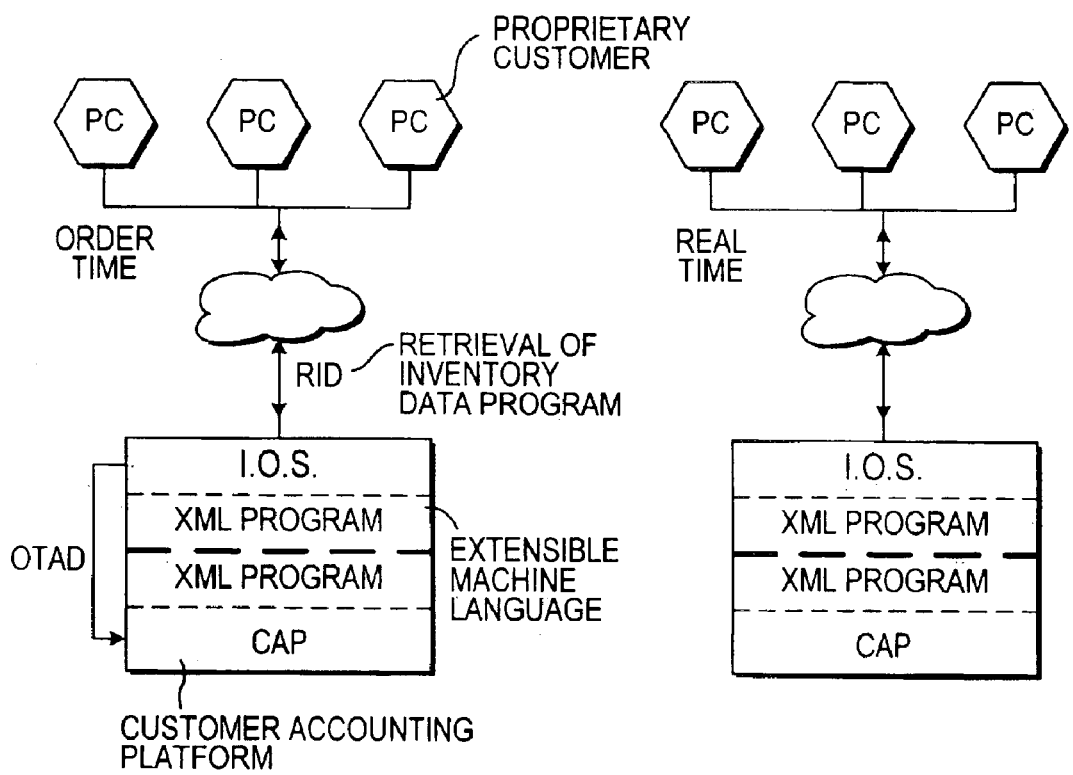
FIG. 6 is a schematic flow chart as the stand alone platform according to the present invention.

The I.O.S. system stand alone platform may be applied in a customer's accounting platform (CAP) which interphases with either the I.O.S. exchange or through an extensible machine language (XML) or Middleware interphase program as previously described and as shown in FIG. 6. In this application, a CAP XML program for a specific accounting platform (as hereinafter described) need be developed only once, whereby subsequent installations of a specific CAP XML program can be carried out in a "cookie cutter" fashion. In the I.O.S. stand alone platform configuration, communication between the I.O.S. and the customer accounting platform (CAP) flows through standard XML interphase programs. The I.O.S. XML program provides a uniform standard that must be adhered to individual customer accounting platform XML programs are developed. As contemplated by this embodiment, the XML accounting system platforms (ASPs) may be provided in order time or real time.

Global Exchange—Search Time Participation

Figure 7:
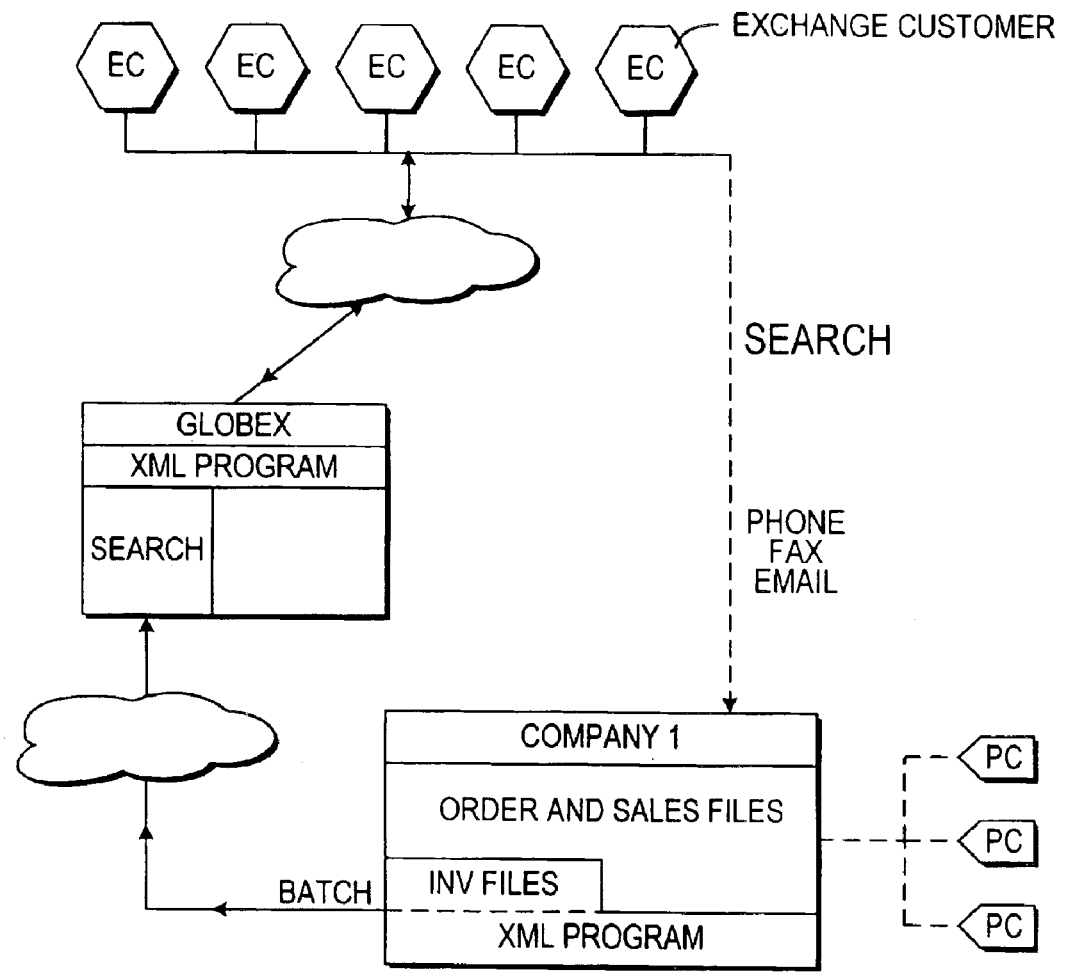
FIG. 7 is a schematic flow chart of the global exchange search time participation system according to the present invention.

In the embodiment shown in FIG. 7, the search time participant (STP) forwards inventory to the global exchange in a batch file or through the use of the global exchange retrieval of inventory data program. The search time participant typically will be a smaller business with limited financial resources, have a basic accounting platform, e.g. QuickBooks, and a basic, if any, asset management system and without an Internet site or Internet order capability for their customers. The search time participant typically will forward a smaller inventory and inventory batch files to the global exchange. This system contemplates that the search time participant will not receive exchange customer orders, quotes, or a target price request through the global exchange. The exchange customer may telephone, fax, or e-mail orders to the search time participant.

Order Time Approval Data Program

Figure 8:
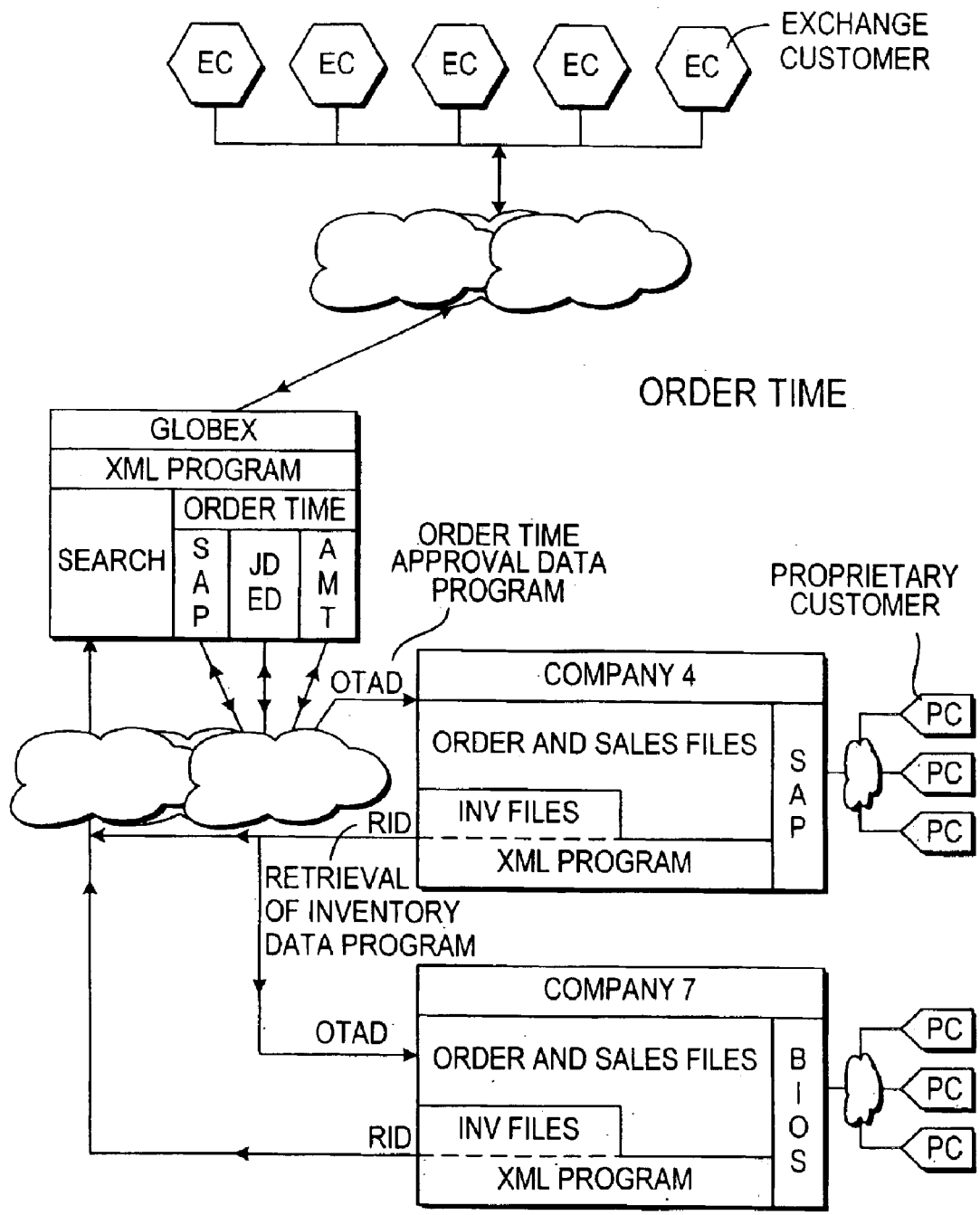
FIG. 8 is a schematic flow chart of the global exchange order time participation system according to the present invention.

As shown in FIG. 8, the invention in this environment includes an order time approval data program (OTAD) which automatically notifies a vendor customer or proprietary vendor customer of a customer's activity in their inventory and holds ordered items only against an order. The vendor customer or proprietary vendor customer is notified of any target price requests (TPRs) quotes or orders through the vendor customer or proprietary vendor customer vendor's viewer screen, which displays various items of order information. This information includes a list of new orders that must be assigned either a pending, approved, or rejected status, a list of pending orders, and a list of approved orders, The vendor viewer screen is also operative to view a list of rejected orders. An assignment of the status of the new orders is accomplished by forwarding the new order by exchange customer or proprietary exchange customer to the OTP which remains pending until it is acknowledged and approved by the vendor customer or proprietary vendor customer. Thus, a new order may be modified, e.g., in quantity and/or price.

A pending order may also be modified, e.g., as to the quantity and/or price, and returned to the vendor customer or proprietary vendor customer for review and resubmission. A pending order is approved or rejected within a predetermined period of time; otherwise, it is automatically assigned a rejected status and the previously committed items are then returned to inventory. If an approved order is not processed for shipment within a predetermined period of time, it is automatically assigned a rejected status and items committed against that order are similarly returned to inventory. Approved orders may be entered manually or semi-manually into the order time participants customers accounting platform. The order time approval data program (OTAD) also has the ability to view a list of rejected orders.

Global Exchange Consortium—Real Time Participation

Figure 9:
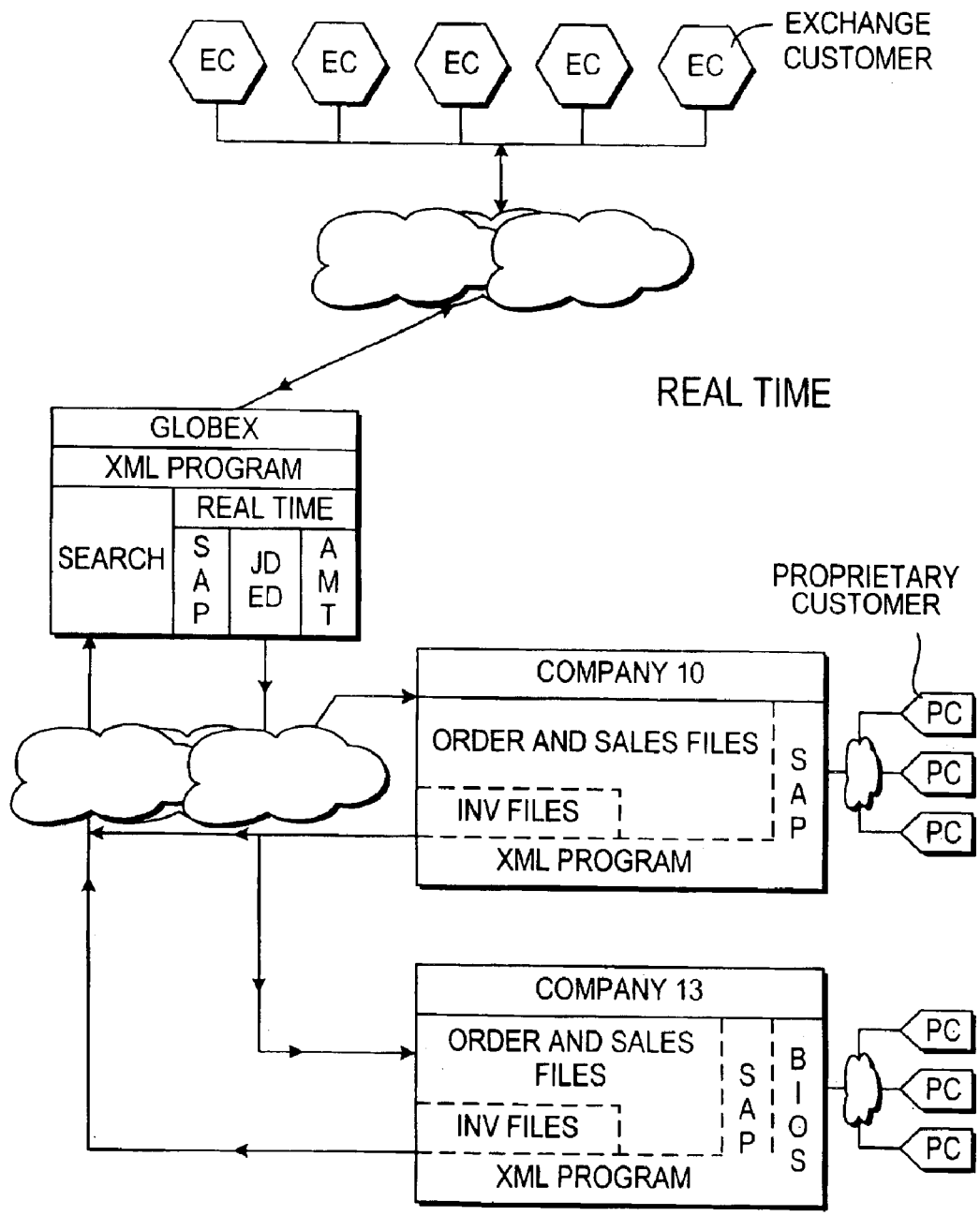
FIG. 9 is the global exchange real time participation system according to the present invention.

In this embodiment illustrated in FIG. 9, the vendor customer's accounting platform files integrates seamlessly with the global exchange files. In addition the vendor customer may offer his inventory to proprietary clients through his own proprietary Internet order system, e.g., company No. 10 shown in FIG. 9. The vendor customer may also offer his inventory through his proprietary clients (e.g., company No. 13) through his copy of the Internet operating system (IOS). In this configuration, the IOS may be hosted at the vendor customer service site or at the global exchange consortium site.

Target Price Request and Quote Information

New quotes and target price requests are assigned Pending, Approved, or Rejected status. A new quote or target price request forwarded by an exchange customer or a proprietary exchange customer to an order time participant (OTP) is assigned a Pending status until it is approved by the vendor customer, or proprietary vendor customer. A new quote or target price request may be modified, e.g., as to quantity and/or price and returned to the vendor customer or proprietary vendor customer for review and submission as an approved order; however, items are not permitted against a quote or a target price request.

The list of pending quotes or target price requests are similarly processed. Thus, a pending quote target price request, e.g., as to quantity and/or price, and returned to the vendor customer or proprietary vendor customer for review and submission as an approved order. A pending quote or target price request will be automatically cancelled within a predetermined time period. The system also provides a list of approved quotes or target price requests wherein a pending quote or target price request is automatically assigned a rejected status within a predetermined period. The system also provides a list of rejected quotes and target price requests. In addition, the system may automatically provide e-mail documentation of all vendor viewer screen activity.

Although the systems are functionally identical, the above I.O.S. exchange system may, for business reasons, be made to appear as belonging to a proprietary exchange owner. The proprietary exchange system, as shown in FIG. 10, can thus function as an inventory collection and ordering exchange for different segments, e.g., divisions within a single company. Thus, the proprietary exchange customer may search the proprietary exchange inventories to enable it to order product in either order time or real time and/or request a quote to negotiate a price by means of a target price request.

I.O.S.—Accounting System Platform

Figure 11:
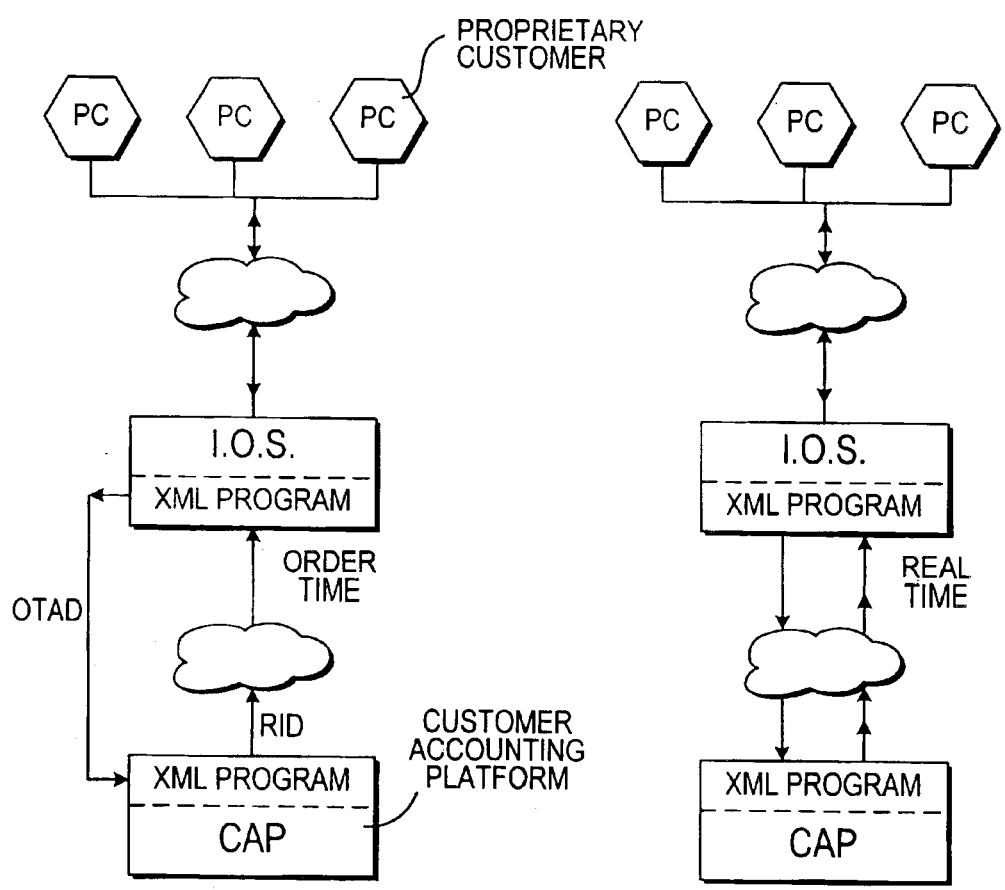
FIG. 11 is the accounting system platform configuration according to the present invention.

In one embodiment, the I.O.S. stand alone model may be in the form of an accounting system platform (ASP) as shown in FIG. 11. The embodiment contemplates that the Internet order system (IOS) is either sold or licensed to the customer and is posted by the global exchange described hereinabove. In this embodiment, the flow of communication between the Internet Order System and the customer's accounting platform is through standard XML interphase programs. The Internet Order System XML provides a uniform standard which must be adhered to as the individual customer accounting platform XML programs are developed, the latter being either order time or real time. As suggested above, once a customer's accounting platform XML program is developed, subsequent installations may be easily replicated.

It will be readily observed from the foregoing detailed description of the invention and from the illustrated embodiments thereof, that numerous variations and modifications may be effective without departing from the spirit and scope of concepts and principles of this invention.

What is claimed is:

1. A computerized method for transmitting inventory information between a plurality of vendors and at least one buyer, comprising the steps of:

creating an exchange platform provided at a location removed from the buyer and the vendors;

transmitting first inventory information from a first group of vendors denoted as search time participants to said exchange platform at first discrete time intervals during a twenty-four hour period of time;

transmitting second inventory information from a second group of vendors denoted as order time participants to said exchange platform polling said second group of vendors at second discrete time intervals during said twenty-four hour period of time, the number of said first discrete time intervals being less than said second discrete time intervals, resulting in the receipt of said second inventory information at said exchange platform more frequently than the receipt of said first inventory information at said exchange platform, said second inventory information including a purchase price;

transmitting third inventory information from a third group of vendors denoted as real time participants to said exchange platform at third discrete time intervals during said twenty-four hour period of time, the number of third discrete time intervals being greater than said second discrete time intervals, resulting in the receipt of said third inventory information at said exchange platform more frequently than the receipt of said second inventory information at said exchange platform;

periodically reviewing said first, second and third inventory information by the buyer through said exchange platform;

transmitting a first purchase order from the buyer directly to said search time participants without sending said first purchase order to said exchange platform;

providing said exchange platform with an order time approval program allowing the buyer to communicate with said order time participants through said exchange platform;

transmitting a second purchase order from the buyer to said order time approval program at said exchange platform, said exchange platform transmitting said second purchase order to one of said order time participants;

transmitting a first communication from one of said order time participants to the buyer through said exchange platform responsive to said second purchase order, said first communication rejecting or approving said second purchase order;

transmitting a third purchase order from the buyer to one of said real time participants through said exchange platform;

transmitting a second communication from one of said real time participants to the buyer through said exchange platform; said second communication sent to the buyer in real time indicating whether said third purchase order was rejected or approved; and the buyer purchasing inventory from one of the vendors when one of said purchase orders is approved by one of the vendors.

2. The method in accordance with claim 1, wherein said first inventory information is sent to said exchange platform use batch file.

3. The method an accordance with claim 2, wherein said batch file is sent to said exchange platform once a day.

4. The method in accordance with claim 1, wherein said second inventory information is sent to said exchange platform at a frequency not to exceed every five minutes.

5. The method in accordance with claim 1, wherein said third inventory information is sent to said exchange platform in real time at every instance there is a change in said inventory information.

6. The method in accordance with claim 1, wherein the buyer transmits to said order time approval program a target price for at least one item in said second inventory information, not equal to the asking price of said item.

7. The method in accordance with claim 6, wherein at least one of said order time participant transmits to the buyer a rejection or approval of said target price.

* * * * *